(12) United States Patent
Hong et al.

(10) Patent No.: US 12,345,854 B2
(45) Date of Patent: Jul. 1, 2025

(54) PROTECTIVE SHEET AND CAMERA MODULE COMPRISING SAME

(71) Applicant: LG INNOTEK CO., LTD., Seoul (KR)

(72) Inventors: Ga Young Hong, Seoul (KR); Dae Hee Lee, Seoul (KR); Won Seob Shin, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 129 days.

(21) Appl. No.: 18/023,125

(22) PCT Filed: Aug. 26, 2021

(86) PCT No.: PCT/KR2021/011457
§ 371 (c)(1),
(2) Date: Feb. 24, 2023

(87) PCT Pub. No.: WO2022/045803
PCT Pub. Date: Mar. 3, 2022

(65) Prior Publication Data
US 2023/0314663 A1    Oct. 5, 2023

(30) Foreign Application Priority Data

Aug. 26, 2020   (KR) .................. 10-2020-0107904

(51) Int. Cl.
*G02B 1/14*        (2015.01)

(52) U.S. Cl.
CPC ..................... *G02B 1/14* (2015.01)

(58) Field of Classification Search
CPC .................. G03B 11/04; G02B 1/14
See application file for complete search history.

(56) References Cited

FOREIGN PATENT DOCUMENTS

| | | | | |
|---|---|---|---|---|
| CN | 108307636 A | 7/2018 | | |
| KR | 10-1994-0004032 A | 3/1994 | | |
| KR | 100769823 B1 | * | 10/2007 | ............... H04N 7/18 |
| KR | 20-0440100 Y1 | 5/2008 | | |
| KR | 10-2008-0107869 A | 12/2008 | | |
| KR | 10-0897676 B1 | 5/2009 | | |
| KR | 10-2015-0066790 A | 6/2015 | | |

* cited by examiner

*Primary Examiner* — Minh Q Phan
(74) *Attorney, Agent, or Firm* — Birch, Stewart, Kolasch & Birch, LLP

(57) ABSTRACT

A protective sheet according to an embodiment includes an optical film layer; and an adhesive layer disposed on one surface of the optical film layer and including a first open region; wherein an outer width of the optical film layer is greater than an outer width of the adhesive layer, wherein a central region of the one surface of the optical film layer is exposed through the first open region of the adhesive layer, and an outer region of the one surface of the optical film layer is exposed by a difference from the outer width of the adhesive layer.

19 Claims, 6 Drawing Sheets

PROTECTIVE SHEET AND CAMERA MODULE COMPRISING SAME

CROSS REFERENCE TO RELATED APPLICATIONS

This application is the National Phase of PCT International Application No. PCT/KR2021/011457, filed on Aug. 26, 2021, which claims priority under 35 U.S.C. 119(a) to Patent Application No. 10-2020-0107904, filed in the Republic of Korea on Aug. 26, 2020, all of which are hereby expressly incorporated by reference into the present application.

TECHNICAL FIELD

An embodiment relates to a protective sheet, and in particular, to a protective sheet attached to a black barrel and a camera module comprising the protective sheet.

BACKGROUND ART

Recently, miniature camera modules have been developed, and the miniature camera modules are widely used in small electronic products such as smart phones, notebook computers, and game devices.

That is, most mobile electronic devices, including smartphones, are equipped with a camera device for obtaining an image from an object, and the mobile electronic devices are gradually becoming smaller for easy portability.

Such a camera device generally may include a lens through which light is incident, an image sensor that captures light incident through the lens, and a plurality of components for transmitting and receiving electrical signals for images obtained from the image sensor to an electronic device equipped with a camera device. In addition, these image sensors and components are generally mounted on a printed circuit board and connected to an external electronic device.

The camera device includes a lens barrel accommodating a lens. Such the lens barrel is generally made of a non-metal material such as a synthetic resin material by using a plastic injection or die casting method.

On the other hand, the camera module as described above is disposed in a mobile electronic device. In this case, a case of the mobile electronic device has an opening exposing the lens barrel and a lens accommodated in the lens barrel. In this case, a black coating layer for preventing reflection may be formed on a surface of the lens barrel. The black coating layer prevents reflection of light, thereby improving a quality of an image acquired by the camera module.

However, the black coating layer of the lens barrel is easily damaged during a manufacturing process of the camera module, and there is a problem in that appearance defects occur.

DISCLOSURE

Technical Problem

An embodiment provides a protective sheet capable of protecting a black coating layer of a lens barrel and a camera module including the protective sheet.

In addition, the embodiment provides a protective sheet capable of minimizing an adhesive material remaining on the black coating layer of the lens barrel and a camera module including the protective sheet.

In addition, the embodiment provides a protective sheet capable of preventing adhesive material from remaining on a surface of a lens and a camera module including the protective sheet.

Technical problems to be solved by the proposed embodiments are not limited to the above-mentioned technical problems, and other technical problems not mentioned may be clearly understood by those skilled in the art to which the embodiments proposed from the following descriptions belong.

Technical Solution

A protective sheet according to an embodiment comprises an optical film layer; and an adhesive layer disposed on one surface of the optical film layer and including a first open region; wherein an outer width of the optical film layer is greater than an outer width of the adhesive layer, a central region of the one surface of the optical film layer is exposed through the first open region of the adhesive layer, and an outer region of the one surface of the optical film layer is exposed by a difference from the outer width of the adhesive layer.

In addition, the optical film layer includes a second open region overlapping the first open region, wherein a width of the second open region of the optical film layer is greater than a width of the first open region of the adhesive layer, wherein the one surface of the optical film layer includes a first region where the adhesive layer is disposed and a second region other than the first region, and wherein the second region includes an outer region adjacent to an outer end of the optical film layer and an inner region adjacent to an inner end of the optical film layer.

In addition, the adhesive layer includes at least one air passage.

In addition, the air passage connects an inner end of the adhesive layer and an outer end of the adhesive layer.

In addition, the inner region and the outer region of the optical film layer communicate with each other through the air passage.

In addition, a width of one end of the air passage adjacent to the inner end of the adhesive layer is different from a width of the other end of the air passage adjacent to the outer end of the adhesive layer.

In addition, the air passage includes one end adjacent to the inner end of the adhesive layer, the other end adjacent to the outer end of the adhesive layer, and an inner region between the one end and the other end, wherein a width of the one end of the air passage is same as a width of the other width of the air passage, and wherein a width decreases toward the inner region from the one end and the other end.

On the other hand, a camera module according to an embodiment comprises a lens barrel including an opening in which a lens is accommodated; and a protective sheet including an open region for opening the opening of the lens barrel and attached to an upper surface of the lens barrel; wherein the protective sheet includes: an optical film layer; and an adhesive layer disposed on one surface of the optical film layer and including the open region overlapping the opening of the lens barrel in a vertical direction; wherein an outer width of the optical film layer is greater than an outer width of the adhesive layer, and wherein the adhesive layer includes at least one air passage, In addition, the lens barrel includes a black coating layer, and wherein the protective sheet is attached on the black coating layer of the lens barrel.

In addition, the air passage includes a region of varying width between one end and the other end.

Effects of the Invention

An embodiment includes a protective sheet attached to a black coating layer on an upper surface of a lens barrel. The protective sheet includes an open region for opening an opening corresponding to a lens accommodating part of the lens barrel. Accordingly, the embodiment can minimize damage to the black coating layer of the lens barrel, and can solve a reliability problem that may occur due to an adhesive material of the protective sheet remaining on the lens.

In addition, the embodiment includes a protective sheet including an optical film layer and an adhesive layer. In this case, the adhesive layer of the protective sheet includes at least one air passage. According to the embodiment, the adhesive material of the protective sheet can be easily separated from the lens barrel without remaining on the black coating layer of the lens barrel by the air passage formed in the adhesive layer, thereby solving the reliability problem.

BEST MODE

Hereinafter, embodiments of the present invention will be described in detail with reference to the accompanying drawings.

However, the spirit and scope of the present invention is not limited to a part of the embodiments described, and may be implemented in various other forms, and within the spirit and scope of the present invention, one or more of the elements of the embodiments may be selectively combined and replaced.

In addition, unless expressly otherwise defined and described, the terms used in the embodiments of the present invention (including technical and scientific terms may be construed the same meaning as commonly understood by one of ordinary skill in the art to which this invention belongs, and the terms such as those defined in commonly used dictionaries may be interpreted as having a meaning that is consistent with their meaning in the context of the relevant art. Further, the terms used in the embodiments of the present invention are for describing the embodiments and are not intended to limit the present invention.

In this specification, the singular forms may also include the plural forms unless specifically stated in the phrase, and may include at least one of all combinations that may be combined in A, B, and C when described in "at least one (or more) of A (and), B, and C". Further, in describing the elements of the embodiments of the present invention, the terms such as first, second, A, B, (A, and (b) may be used.

These terms are only used to distinguish the elements from other elements, and the terms are not limited to the essence, order, or order of the elements. In addition, when an element is described as being "connected", "coupled", or "contacted" to another element, it may include not only when the element is directly "connected" to, "coupled" to, or "contacted" to other elements, but also when the element is "connected", "coupled", or "contacted" by another element between the element and other elements.

In addition, when described as being formed or disposed "on (over)" or "under (below)" of each element, the "on (over)" or "under (below)" may include not only when two elements are directly connected to each other, but also when one or more other elements are formed or disposed between two elements. Further, when expressed as "on (over)" or "under (below)", it may include not only the upper direction but also the lower direction based on one element.

An optical axis direction used below is defined as an optical axis direction of a camera actuator and a lens coupled to a camera module, and a vertical direction may be defined as a direction perpendicular to the optical axis.

"Auto focus function" used below is defined as a function for automatically adjusting a focus on a subject by adjusting a distance from an image sensor and moving a lens in the optical axis direction according to the distance of the subject so that a clear image of the subject may be obtained on the image sensor.

Meanwhile, "auto focus" may correspond to "AF (Auto Focus)". In addition, a closed-loop auto focus (CLAF) control may be defined as real-time feedback control of the lens position by sensing the distance between the image sensor and the lens to improve focus adjustment accuracy.

In addition, before a description of an embodiment of the present invention, a first direction may mean a x-axis direction shown in drawings, and a second direction may be a different direction from the first direction. For example, the second direction may mean a y-axis direction shown in the drawing in a direction perpendicular to the first direction. Also, a third direction may be different from the first and second directions. For example, the third direction may mean a z-axis direction shown in the drawing in a direction perpendicular to the first and second directions. Here, the third direction may mean an optical axis direction.

Hereinafter, a configuration of the camera module according to a present embodiment will be described with reference to the drawings.

Figure 1:
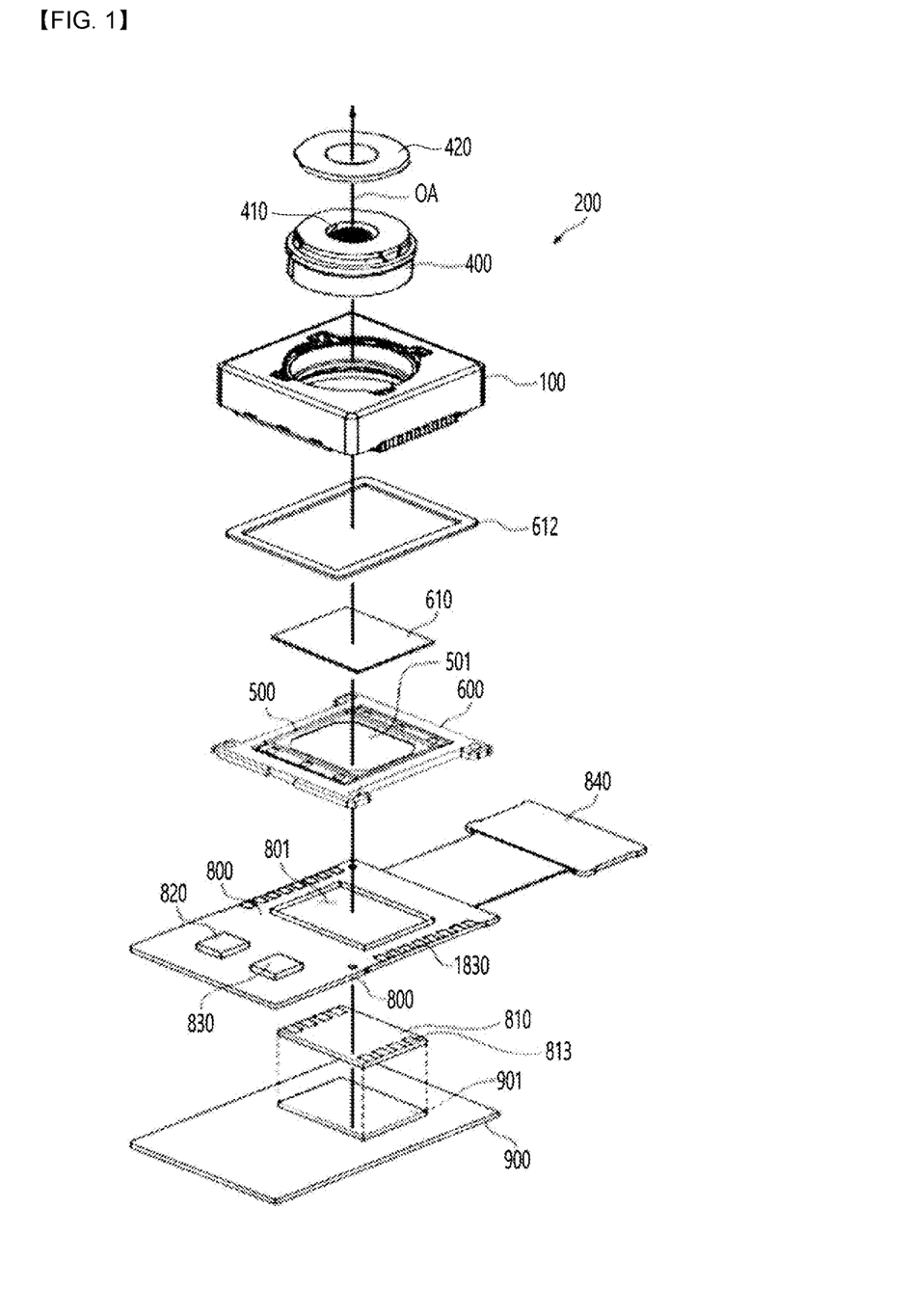
FIG. 1 is an exploded perspective view of a camera module according to an embodiment.
Figure 2:
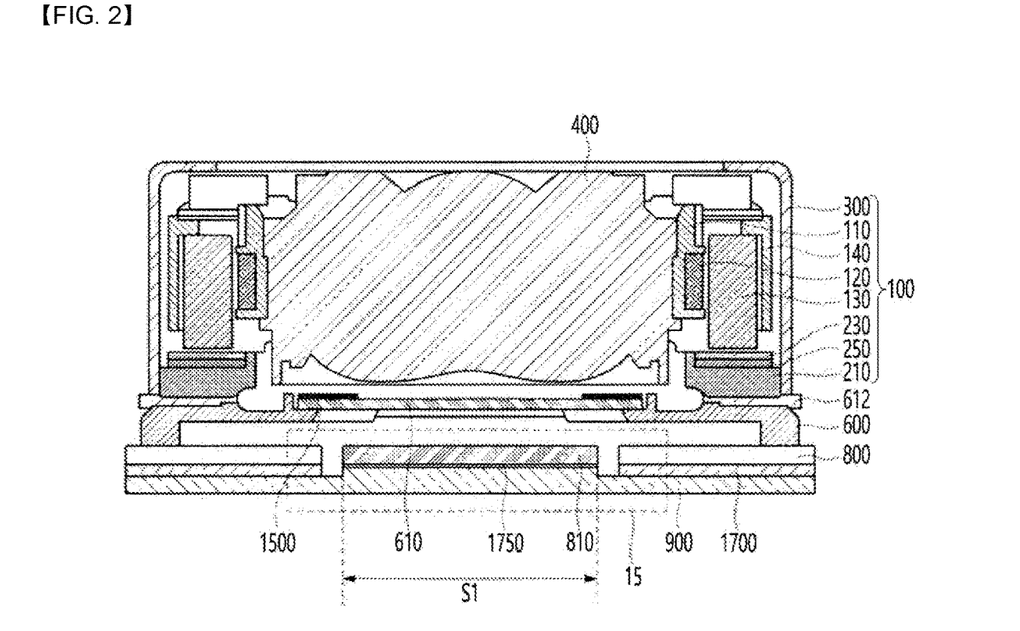
FIG. 2 is a cross-sectional view of a camera module of FIG. 1 according to an embodiment.
Figure 3:
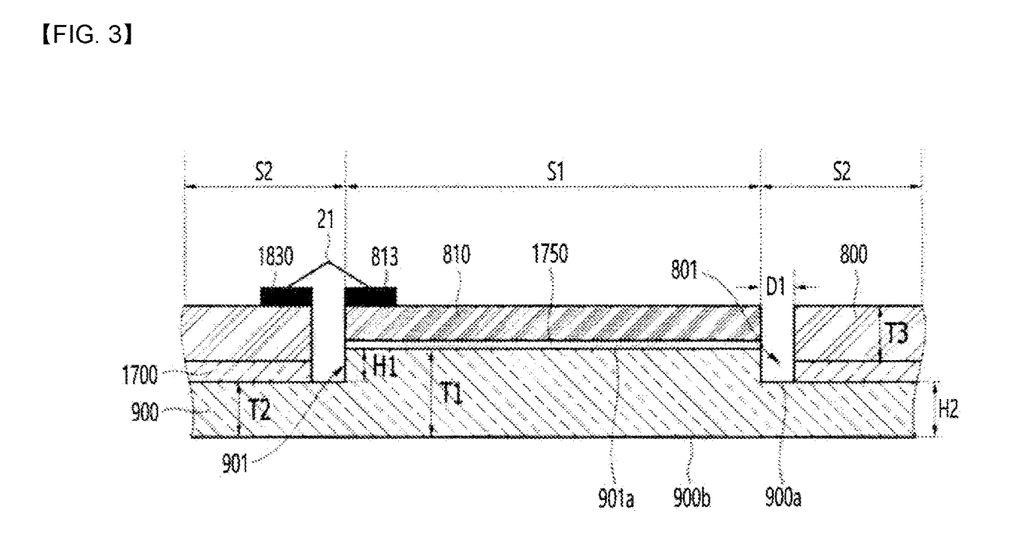
FIG. 3 is an enlarged view of a dotted line portion of FIG. 2.

FIG. 1 is an exploded perspective view of a camera module 200 according to an embodiment, FIG. 2 is a cross-sectional view of a camera module 25 of FIG. 1 according to an embodiment, and FIG. 3 is an enlarged view of a dotted line portion 15 of FIG. 2.

Referring to FIGS. 1 to 3, the camera module 200 may include a lens or lens barrel 400, a lens driving device 100, a filter 610, a holder 600, a circuit board 800, a stiffener 900 and an image sensor 810. Here, "camera module" may be expressed by replacing "capturing device" or "photographer", and the holder 600 may be expressed by replacing "sensor base".

In addition, the camera module 200 may further include a blocking member 1500 disposed on the filter 610.

In addition, the camera module 200 may further include an adhesive member 612.

In addition, the camera module 200 may further include a motion sensor 820, a control unit 830, and a connector 840.

A lens or a lens barrel 400 may be mounted on a bobbin 110 of the lens driving device 100. The lens barrel 400 may accommodate a lens 410 therein. In addition, a black coating layer (not shown) may be formed on an upper surface of the lens barrel 400. In this case, a protective sheet 420 may be attached to the black coating layer on the upper surface of the lens barrel 400. The protective sheet 420 may protect the black coating layer on the upper surface of the lens barrel 400. The protective sheet 420 may be removed from the lens barrel 400 when the camera module 300 is in use.

The lens driving device 100 may drive a lens or a lens barrel 400

The camera module 200 may be any one of a camera module for Auto Focus (AF) and a camera module for Optical Image Stabilizer (OIS). A camera module for AF refers to a thing capable of performing only an autofocus function, and an OIS camera module refers to a thing capable of performing an autofocus function and an OIS (Optical Image Stabilizer) function.

For example, the lens driving device 100 may be a lens driving device for AF or a lens driving device for OIS, and here, the meanings of "for AF" and "for OIS" may be the same as those described in the camera module for AF and the camera module for OIS.

For example, the lens driving device 100 of the camera module 200 may be a lens driving device for OIS.

The lens driving device 100 may include a housing 140, a bobbin 110 disposed in the housing 140 and for mounting a lens or lens barrel 400, a first coil 120 disposed on the bobbin 110, a magnet 130 disposed in the housing 140 and facing the first coil 120, at least one upper elastic member (not shown) coupled to an upper portion of the bobbin 110 and an upper portion of the housing 140, at least one lower elastic member (not shown) coupled to a lower portion of the bobbin 110 and a lower portion of the housing 140, a second coil 230 disposed under the bobbin 110 (or/and housing 140), a circuit board 250 disposed under the second coil 230, and a base 210 disposed under the circuit board 250.

In addition, the lens driving device 100 may further includes a cover member 300 coupled to the base 210 and providing a space for accommodating components of the lens driving device 100 together with the base 210.

In addition, the lens driving device 100 may further include a support member (not shown) that electrically connects the circuit board 250 and the upper elastic member and supports the housing 140 with respect to the base 210. Each of the first coil 120 and the second coil 230 may be electrically connected to the circuit board 250 and receive a driving signal (driving current) from the circuit board 250.

For example, the upper elastic member may include a plurality of upper springs, and the support member may include support members connected to the upper springs, and the first coil 120 may be electrically connected to the circuit board 250 through the upper springs and the support member. The circuit board 250 may include a plurality of terminals, and a part of the plurality of terminals may be electrically connected to each of the first coil 120 and/or the second coil 230.

The bobbin 110 and the lens or lens barrel 400 coupled thereto may be moved in the optical axis direction by the electromagnetic force due to the interaction between the first coil 120 and the magnet 130, as a result, a displacement of the bobbin 110 is controlled in the optical axis direction, so that AF driving can be implemented.

In addition, the housing 140 may be moved in a direction perpendicular to the optical axis by the electromagnetic force due to the interaction between the second coil 230 and the magnet 130, as a result, image stabilization or OIS driving may be implemented.

In addition, the lens driving device 100 of the camera module 200 may further include a sensing magnet (not shown) disposed on the bobbin 110 and an AF position sensor (eg, a hall sensor, not shown) disposed on the housing 140 for AF feedback driving. In addition, the lens driving device 100 may further include a circuit board (not shown) disposed on the housing and/or the base and on which the AF position sensor is disposed or mounted. In another embodiment, the AF position sensor may be disposed on the bobbin, and the sensing magnet may be disposed on the housing. In addition, the lens driving device 100 may further include a balancing magnet disposed on the bobbin 110 to correspond to the sensing magnet.

The AF position sensor may output an output signal according to a result of detecting a strength of a magnetic field of the sensing magnet according to a movement of the bobbin 100. The AF position sensor may be electrically connected to the circuit board 250 through the upper elastic member (or lower elastic member) and/or the supporting member. The circuit board 250 may provide a driving signal to the AF position sensor, and an output of the AF position sensor may be transmitted to the circuit board 250.

In another embodiment, the lens driving device 100 may be a lens driving device for AF, and the AF lens driving device may include a housing, a bobbin disposed inside the housing, a coil disposed on the bobbin, a magnet disposed on the housing, at least one elastic member coupled to the bobbin and the housing, and a base disposed under the bobbin (or/and the housing).

For example, the elastic member may include the above-described upper elastic member and the lower elastic member.

A driving signal (eg, a driving current) may be provided to the coil, and the bobbin may be moved in the optical axis direction by electromagnetic force due to the interaction between the coil and the magnet. In another embodiment, the coil may be disposed on the housing, and the magnet may be disposed on the bobbin.

In addition, the lens driving device for AF for AF feedback driving may further include a sensing magnet disposed on the bobbin, an AF position sensor (eg, a hall sensor) disposed on the housing, a circuit board disposed or mounted on the housing and/or the base, and a circuit board on which the AF position sensor is disposed and disposed or mounted to the housing and/or base. In another embodiment, the AF position sensor may be disposed on the bobbin, and the sensing magnet may be disposed on the housing.

The camera module according to another embodiment may include a housing coupled to a lens or a lens barrel 400 instead of the lens driving device 100 of FIG. 1 and fixing the lens or the lens barrel 400. The housing may be coupled or attached to an upper surface of a holder 600. The housing attached or fixed to the holder 600 may not be moved, and the position of the housing may be fixed while being attached to the holder 600.

The circuit board may be electrically connected to the coil and the AF position sensor, a driving signal may be provided to each of the coil and the AF position sensor through the circuit board, and the output of the AF position sensor may be transmitted to the circuit board.

The holder 600 may be disposed under a base 210 of the lens driving device 100.

The filter 610 is mounted on the holder 600, and the holder 600 may include a seating part 500 on which the filter 610 is seated.

An adhesive member 612 may couple or attach the base 210 of the lens driving device 100 to the holder 600. For example, the adhesive member 612 may be disposed between a lower surface of the base 210 and an upper surface of the holder 600, and may adhere them to each other.

The adhesive member 612 may serve to prevent foreign substances from being introduced into the lens driving device 100 in addition to the above-described adhesive role. For example, the adhesive member 612 may be an epoxy, a thermosetting adhesive, or an ultraviolet curable adhesive.

The filter 610 may be disposed in a seating part 500 of the holder 600.

The seating part 500 of the holder 600 may include a protrusion 500a protruding from an upper surface of the holder 600, but is not limited thereto. In another embodiment, the seating part may be in the form of a recess, a cavity, or a hole concaved from the upper surface of the holder 600.

The protrusion 500a of the seating part 500 may serve to prevent a lower end of the lens or the lens barrel 400 from contacting or colliding with the filter 610 (or/and the blocking member 1500).

The protrusion 500a may be formed to protrude along the side surface of the filter 610 in the optical axis direction. For example, the protrusion 500a may be disposed around the side surface of the filter 610 to surround the side surface of the filter 610.

An inner surface of the protrusion 500a may be provided to face the side surface of the filter 610, and they may be spaced apart from each other. This is to secure a processing tolerance for easily mounting the filter 610 inside the seating part 500 of the holder 600.

In addition, an upper surface of the protrusion 500a may be located higher than an upper surface 610 of the filter 610 in the optical axis direction. This is to prevent the lens or the lower end of the lens barrel 400 from directly colliding with the filter 610 when the lens or the lens barrel 400 is mounted on the lens driving device 100 and moves in the optical axis direction or moves in the direction toward the filter 610 by an external impact.

A shape of the protrusion 500a viewed from an upper side may match a shape of the filter 610, but is not limited thereto. In another embodiment, a shape of the protrusion 500a may be similar to or different from the shape of the filter 610.

The holder 600 may include an opening 501 formed at a portion where the filter 610 is mounted or disposed so that light passing through the filter 610 may be incident on the image sensor 810.

For example, the opening 501 may pass through the holder 600 in the optical axis direction, and may be expressed by replacing "through hole".

For example, the opening 501 may pass through a center of the holder 600 and may be provided in the seating part 500, and an area of the opening 501 may be smaller than an area of the filter 610.

The holder 600 is disposed on the circuit board 800 and may accommodate the filter 610 therein. The holder 600 may support the lens driving device 100 located on an upper side. A lower surface of a base 210 of the lens driving device 100 may be disposed on an upper surface of the holder 600.

For example, a lower surface of the base 210 of the lens driving device 100 may contact an upper surface of the holder 600 and may be supported by the upper surface of the holder 600.

For example, the filter 610 may be disposed in the seating part 500 of the holder 600.

The filter 610 may serve to block light of a specific frequency band in light passing through the lens barrel 400 from entering the image sensor 810.

For example, the filter 610 may be an infrared cut filter, but is not limited thereto. For example, the filter 610 may be disposed to be parallel to an x-y plane perpendicular to the optical axis OA.

The filter 610 may be attached to the seating part 500 of the holder 600 by an adhesive member (not shown) such as UV epoxy.

The circuit board 800 may be disposed under the holder 600, and the holder 600 may be disposed on the upper surface of the circuit board 800.

The holder 600 may be attached to or fixed to the upper surface of the circuit board 800 by an adhesive member such as an epoxy, a thermosetting adhesive, or an ultraviolet curable adhesive. In this case, the adhesive member may be disposed between the lower surface of the holder 600 and the upper surface of the circuit board 800.

The circuit board 800 may have an opening 801 corresponding to an opening 501 of the holder 600. The opening 801 of the circuit board 800 may be in the form of a through hole passing through the circuit board 800 in an optical axis direction.

An image sensor 810 may be disposed in the opening 801 of the circuit board 800.

A stiffener 900 may be disposed below the circuit board 800 and may include a protrusion 901 corresponding to the opening 801 of the circuit board 800 and for mounting the image sensor 810 thereon.

The protrusion 901 may protrude from one region of the upper surface of the stiffener 900 in the optical axis direction. The image sensor 810 may be disposed on the upper surface of the protrusion 901 and may be exposed through the opening 801 of the circuit board 800.

The image sensor 810 disposed on an upper surface of the protrusion 901 of the stiffener 900 may be electrically connected to the circuit board 800 through a wire 21. For example, the wire 21 may connect a terminal 813 of the image sensor 810 and a terminal 1830 of the circuit board 800 to each other.

The stiffener 900 is a plate-like member having a predetermined thickness and hardness, and can stably support the image sensor 810 and prevent damage to the image sensor due to external impact or contact.

In addition, the stiffener 900 may improve a heat dissipation effect of dissipating heat generated from the image sensor to an outside.

For example, the stiffener 900 may be formed of a metal material having high thermal conductivity, such as SUS or aluminum, but is not limited thereto. In another embodiment, the stiffener 900 may be formed of glass epoxy, plastic, or synthetic resin.

In addition, the stiffener 900 may serve as a ground to protect the camera module from electrostatic discharge protection (ESD) by being electrically connected to a ground terminal of the circuit board 800.

The image sensor 810 may be a portion on which the light passing through the filter 610 is incident to form an image included in the light.

The circuit board 800 may be provided with various circuits, elements, control units, etc. in order to convert an image formed on the image sensor 810 into an electrical signal and transmit it to an external device. A circuit pattern electrically connected to an image sensor and various devices may be formed on the circuit board 800.

The holder 600 may be represented by replacing a first holder, and the circuit board 800 may be represented by replacing a second holder.

The image sensor 810 may receive an image included in light incident through the lens driving device 100 and convert the received image into an electrical signal.

The filter 610 and the image sensor 810 may be spaced apart to face each other in the optical axis OA direction or a first direction In addition, the protrusion 500a of the holder 600 may be disposed to face the filter 610 in the optical axis direction.

The blocking member 1500 may be disposed on the upper surface of the filter 610. The blocking member 1500 may be replaced with a "masking unit".

For example, the blocking member 1500 may be disposed on a corner region of the upper surface of the filter 610, and serve to block at least a portion of light incident toward the corner region of the filter 610 through the lens or lens barrel 400 from passing through the filter 610. For example, the blocking member 1500 may be coupled or attached to the upper surface of the filter 1610.

For example, the filter 610 may be formed in a rectangular shape viewed in the optical axis direction, and the blocking member 1500 may be formed symmetrically with respect to the filter 610 along each side of the upper surface of the filter 610.

In this case, the blocking member 1500 may be formed to have a constant width at each side of the upper surface of the filter 1610.

The blocking member 1500 may be formed of an opaque material. For example, the blocking member 1500 may be provided in the form of an opaque adhesive material applied to the filter 610 or in the form of a film attached to the filter 610.

The filter 610 and the image sensor 810 may be disposed to face each other in the optical axis direction, and the blocking member 1500 may at least partially overlap the terminal 1830 and/or the wire 21 disposed on the circuit board 800 in the optical axis direction.

The wire 21 and the terminal 1830 may be formed of a conductive material, for example, gold (Au), silver (Ag), copper (Cu), a copper alloy, etc., and such a conductive material may have a property of reflecting light. The light passing through the filter 610 may be reflected by the terminal 1830 and the wire 21 of the circuit board 800, and an instantaneous flashing, that is, a flare phenomenon may occur by this reflected light, and such a flare phenomenon may distort an image formed on the image sensor 810 or deteriorate image quality.

The blocking member 1500 is disposed so that at least a portion overlaps with the terminal 1830 and/or the wire 21 in the optical axis direction, thereby, it is possible to block the light directed to the terminal 1830 of the circuit board 800, and/or the wire 21 among the light passing through the lens or the lens barrel 400, thereby preventing the flare phenomenon from occurring, and accordingly, it is possible to prevent the image formed on the image sensor 810 from being distorted or from deterioration of image quality.

A motion sensor 820 may be mounted or disposed on the circuit board 800, and may be electrically connected to the controller 830 through a circuit pattern provided on the circuit board 800.

The motion sensor 820 outputs rotational angular velocity information by the movement of the camera module 200. The motion sensor 820 may be implemented as a 2-axis or 3-axis gyro sensor or an angular velocity sensor.

A control unit 830 is mounted or disposed on the circuit board 800.

The circuit board 800 may be electrically connected to the lens driving device 100. For example, the circuit board 800 may be electrically connected to the circuit board 250 of the lens driving device 100.

For example, a driving signal may be provided to each of the first coil 120 and the second coil 230 of the lens driving device 100 through the circuit board 800, and a drive signal may be provided to the AF position sensor (or OIS position sensor). Also, the output of the AF position sensor (or OIS position sensor) may be transmitted to the circuit board 800.

The connector 840 is electrically connected to the circuit board 800, and may include a port for electrically connecting to an external device.

An adhesive member 1750 may be disposed between a lower surface of the image sensor 810 and an upper surface 901a of the protrusion 901, and the image sensor 810 may be attached or fixed to the upper surface 901a of the protrusion 901 by the adhesive member 1750. The adhesive member 1750 may be an epoxy, a thermosetting adhesive, an ultraviolet curable adhesive, or an adhesive film, but is not limited thereto.

In addition, an adhesive member 1700 may be disposed between a lower surface of the circuit board 800 and the upper surface 900a of a second region S2 of the stiffener 900, and the circuit board 800 may be attached or fixed to the stiffener 900 by the adhesive member 1700. For example, the adhesive member 1700 may be an epoxy, a thermosetting adhesive, an ultraviolet curable adhesive, or an adhesive film, but is not limited thereto.

An area of the upper surface of the protrusion 901 may be equal to or greater than an area of the lower surface of the image sensor 810. For example, it is an image sensor, and in another embodiment, an edge of the lower surface of the image sensor 810 may be spaced apart from an edge of the upper surface 901a of the protrusion 901.

For example, a ratio (H1:H2) of a first height H1 from the upper surface 900a of the second region S2 of the stiffener 900 to the upper surface 901a of the protrusion 901 and a second height H2 from the lower surface 900b of the stiffener 900 to the upper surface 900a of the second region S2 of the stiffener 900 may be 1:0.67 to 1:2.1.

When a value obtained by dividing the second height by the first height (H2/H1) is less than 0.67, the stiffener 900 is easily bent or deformed to the extent that it cannot support the circuit board 800.

In addition, when a value obtained by dividing the second height by the first height (H2/H1) exceeds 2.1, the flatness of the stiffener 900 cannot be improved as the protruding height of the protrusion 901 is insignificant, and an effect of reducing a step between the upper surface of the image sensor 810 and the upper surface of the circuit board 800 is reduced in the optical axis direction, and thus reliability of wire bonding between them cannot be secured.

For example, The H1 may be 80 [μm] to 150 [μm], and the H2 may be 100 [μm] to 170 [μm].

A height of the upper surface 901a of the protrusion 901 of the stiffener 900 based on the lower surface 900b of the stiffener 900 may be lower than a height of the upper surface of the circuit board 800 disposed on the stiffener 900.

For example, the stiffener 900 may include a first region S1 and a second region S2, the first region S1 may be a region to which the image sensor 810 is attached, and the second region S2 may be a region to which the circuit board 800 is attached.

The first region S1 of the stiffener 900 may include a protrusion 901 protruding from the lower surface of the stiffener toward the upper surface of the stiffener based on the second region S2, and the image sensor 810 may be disposed on the upper surface of the protrusion 901.

For example, the first region S1 of the stiffener 900 may include a protrusion 901 that protrudes more than the second region S2 of the stiffener 900.

A thickness T1 of the first region S1 of the stiffener 900 is greater than a thickness T2 of the second region S2 of the stiffener 900 (T1>T2). Since T1>T2, a warpage of the upper surface 901a of the protrusion 901 of the stiffener 900 can be suppressed, and flatness of the upper surface 901a of the protrusion 901 can be improved. Due to this, the embodiment can improve the reliability of the image sensor 810 disposed on the upper surface of the protrusion 901, and thus, it can improve the optical performance of the camera module.

Since the second region S2 of the stiffener 900 has a constant thickness, the embodiment may not be affected by an overall height of the camera module.

The image sensor 910 is disposed on the upper surface 901a of the protrusion 901, and accordingly, a height difference between the upper surface of the circuit board 800 and the upper surface of the image sensor 810 may be reduced, thereby reducing the wire length between the circuit board 800 and the image sensor 810, furthermore, reliability of wire bonding may be improved.

A distance D1 between a side surface of the protrusion 901 of the stiffener 900 and a side surface of the opening of the circuit board may be 100 [μm] to 250 [μm].

When D1 is less than 100 [μm], a misalignment between the opening 801 of the circuit board 800 and the protrusion 901 of the stiffener 900 may occur because an attachment tolerance for attaching the circuit board 800 to the stiffener 900 is reduced, and the circuit board 800 may be damaged due to a collision between the circuit board 800 and the protrusion 901.

When D1 exceeds 250 [μm], a separation distance between the image sensor and the circuit board increases, and reliability of wire bonding may deteriorate.

Meanwhile, a protective sheet 420 is disposed on the upper surface of the lens barrel 400 according to the embodiment.

In this case, the protective sheet 420 may have a donut shape. Specifically, the protective sheet 420 may expose the opening of the lens barrel 400. For example, a region of the protective sheet 420 overlapping the lens 410 accommodated in the lens barrel 400 in the optical axis direction may be opened. Accordingly, the embodiment can prevent an adhesive material of the protective sheet 420 from remaining on the surface of the lens 410, thereby improving reliability.

Hereinafter, the protective sheet 420 will be described in more detail.

Figure 4:
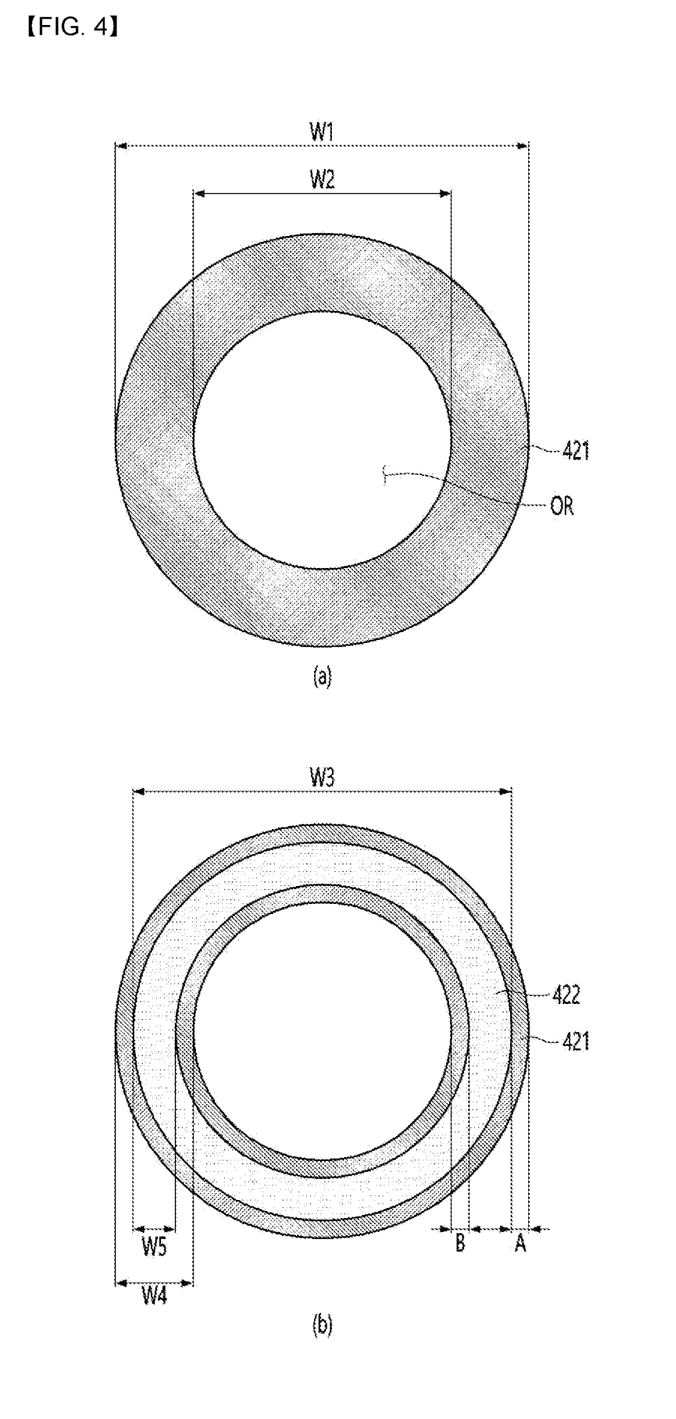
FIG. 4 is a view showing a protective sheet according to the first embodiment.

FIG. 4 is a view showing a protective sheet according to the first embodiment.

FIG. 4(a) is a plan view of the protective sheet 420 according to the first embodiment when viewed from above, and FIG. 4(b) is a bottom view of the protective sheet 420 according to the first embodiment as seen from below.

Referring to (a) and (b) of FIG. 4, the protective sheet 420 of the embodiment includes an optical film layer 421 and an adhesive layer 422.

The optical film layer 421 may serve to protect the black coating layer provided on the upper surface of the lens barrel 400. In this case, the optical film layer 421 may be formed of a transparent material. Accordingly, the embodiment allows to easily check the state of the black coating layer on the upper surface of the lens barrel 400 covered by the optical film layer 421 from an outside.

The optical film layer 421 may have a shape corresponding to the upper surface of the lens barrel 400. For example, the optical film layer 421 may have a circular shape in which an open region OR is formed in a center, but is not limited thereto. For example, when the upper surface of the lens barrel 400 has a rectangular shape, the optical film layer 421 may have a rectangular shape including an open region OR.

In addition, the optical film layer 421 may not include an open region (OR). Accordingly, the optical film layer 421 can protect the upper surface of the lens 410.

Generally, foreign substances should not remain on the upper surface of the lens 410. Accordingly, the adhesive layer 422 constituting the protective sheet 420 is disposed only on the upper surface of the lens barrel, and accordingly, an open region exposing the upper surface of the lens 421 must be included. In contrast, the optical film layer 421 does not include an adhesive material. Accordingly, the optical film layer 421 of a first embodiment may have a shape covering the upper surface of the lens 410, that is, a circular shape not including the open region OR. Alternatively, the optical film layer 421 of a second embodiment may include an open region. The optical film layer 421 of a second embodiment may allow the protective sheet to be removed from the lens through the open region, or the upper surface of the lens to be easily confirmed from the outside.

Hereinafter, a structure in which an open region (OR) is included in the optical film layer 421 will be mainly described. However, the embodiment is not limited thereto, and the open region (OR) may not be included in the optical film layer 421.

An outer width W1 of the optical film layer 421 may correspond to an outer width of the lens barrel 400. In addition, an inner width W2 of the optical film layer 421 or a width of the open region OR may correspond to an inner width of the lens barrel 400 or the width of the opening. Accordingly, the optical film layer 421 may protect an entire region of the black coating layer of the lens barrel 400. In addition, it is possible to prevent the adhesive component of the protective sheet 420 from remaining on the upper surface of the lens 410 by not contacting the lens 410 accommodated in the opening of the lens barrel 400, the optical film layer 421.

Meanwhile, the optical film layer 421 may have a width W4 corresponding to the outer width W1 and the inner width W2.

An adhesive layer 422 may be formed on one surface of the optical film layer 421.

In this case, an area of the adhesive layer 422 may be smaller than an area of the optical film layer 421. For example, an outer width W3 of the adhesive layer 422 may be smaller than an outer width W1 of the optical film layer 421. In addition, an inner width of the adhesive layer 422 may be smaller than an inner width W2 of the optical film layer 421. Accordingly, the adhesive layer 422 of the embodiment may be partially formed on one surface of the optical film layer 421. That is, one surface of the optical film layer 421 may be divided into a region where the adhesive layer 422 is disposed and a region where the adhesive layer 422 is not disposed.

In addition, the adhesive layer 422 may have a width W5 corresponding to the outer and inner widths of the adhesive layer. In this case, the width W5 of the adhesive layer 422 may be smaller than the width W4 of the optical film layer 421.

On the other hand, one surface of the optical film layer 421 may include a first region in which the adhesive layer 422 is disposed and a second region in which the adhesive layer 422 is not disposed. In addition, the second region may include an outer region (A) adjacent to an outer end of the optical film layer 421 and an inner region (B) adjacent to an inner end of the optical film layer 421.

Specifically, the adhesive layer 422 may not be formed in an outer region (A) adjacent to an outer end and an inner region (B) adjacent to an inner end of one surface of the optical film layer 421.

Accordingly, in the embodiment, the optical film layer 421 may be easily separated from the lens barrel 400 in the inner region (B) and the outer region (A) of the optical film layer 421. For example, the inner region (B) and the outer region (A) of the optical film layer 421 are spaced apart from the surface of the black coating layer of the lens barrel 400 by a predetermined distance, and accordingly, the protective sheet 420 may be easily separated from the lens barrel 400 by utilizing the spaced apart space.

Figure 5:
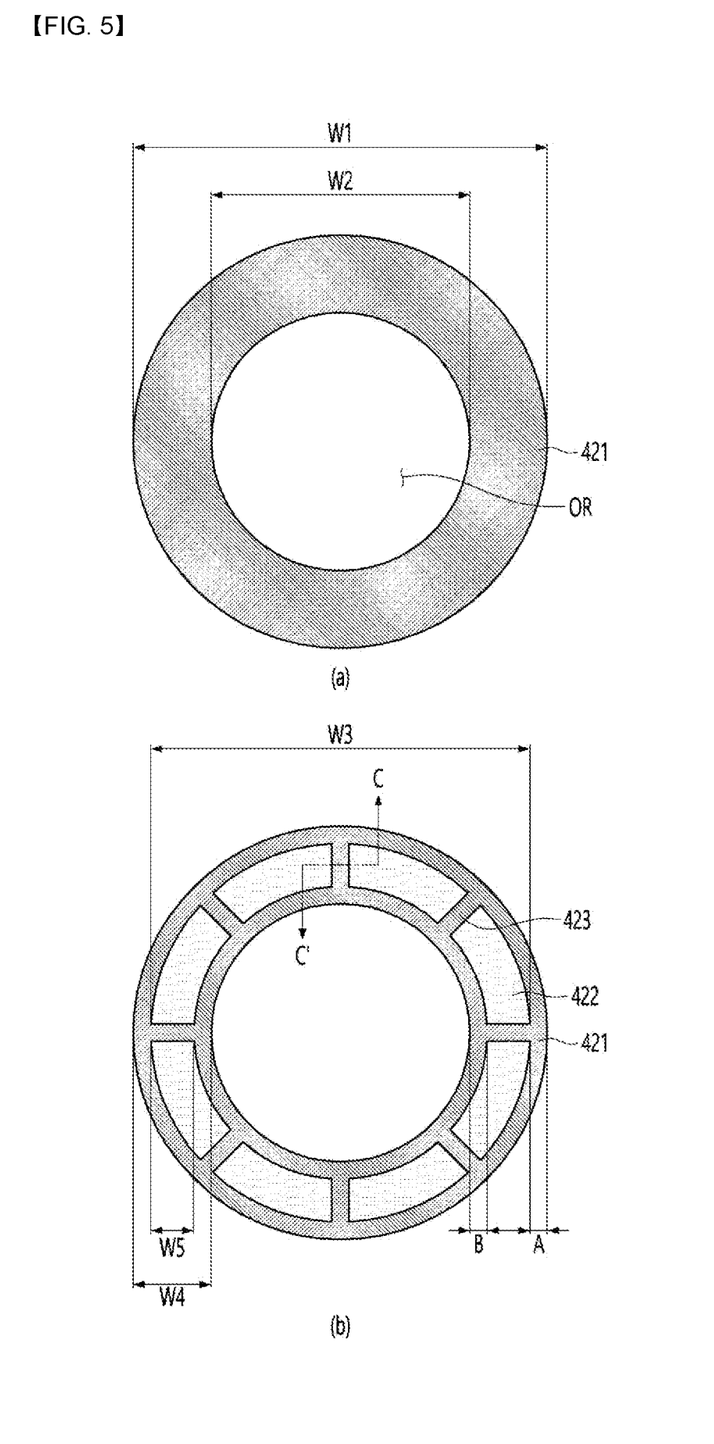
FIG. 5 is a view showing a protective sheet according to a second embodiment.
Figure 6:
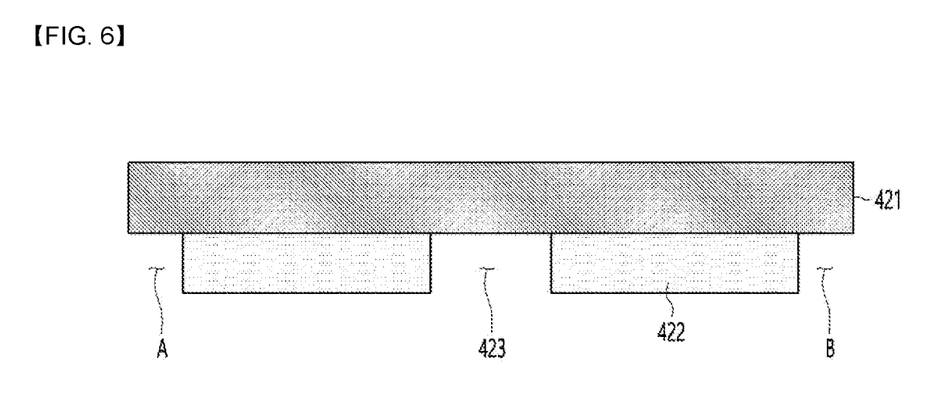
FIG. 6 is a cross-sectional view of the protective sheet of FIG. 5 in a direction C-C'.

FIG. 5 is a view showing a protective sheet according to a second embodiment, and FIG. 6 is a cross-sectional view of the protective sheet of FIG. 5 in a direction C-C'.

FIG. 5(a) is a plan view of the protective sheet 420 according to the second embodiment when viewed from above, and FIG. 5(b) is a bottom view of the protective sheet 420 according to the second embodiment viewed from below.

Referring to (a) and (b) of FIG. 5 and FIG. 6, the protective sheet 420 of the embodiment includes an optical film layer 421 and an adhesive layer 422.

The protective sheet 420 may include an optical film layer 421 and an adhesive layer 422. Since basic characteristics of the optical film layer 421 and the adhesive layer 422 are the same as those of the first embodiment of FIG. 4, a detailed description thereof will be omitted.

The optical film layer 421 may have a shape corresponding to the upper surface of the lens barrel 400. For example, the optical film layer 421 may have a circular shape in which an open region (OR) is formed in a center.

An adhesive layer 422 may be formed on one surface of the optical film layer 421.

One surface of the optical film layer 421 may include a first region on which the adhesive layer 422 is disposed and a second region on which the adhesive layer 422 is not disposed. The second region may include an outer region (A) adjacent to an outer end of the optical film layer 421 and an inner region (B) adjacent to an inner end of the optical film layer 421.

Specifically, the adhesive layer 422 may not be formed in an outer region (A) adjacent to an outer end and an inner region (B) adjacent to an inner end of one surface of the optical film layer 421.

Accordingly, in the embodiment, the optical film layer 421 may be easily separated from the lens barrel 400 in the inner region (B) and the outer region (A) of the optical film layer 421. For example, the inner region (B) and the outer region (A) of the optical film layer 421 are spaced apart from the surface of the black coating layer of the lens barrel 400 by a predetermined distance, and accordingly, the protective sheet 420 may be easily separated from the lens barrel 400 by utilizing the spaced apart space.

Meanwhile, the adhesive layer 422 may include a plurality of air passages 423 spaced apart from each other at regular intervals. The air passage 423 may be formed by connecting an outer end and an inner end of the adhesive layer 422. Accordingly, the adhesive layer 422 may be partitioned into a plurality of regions through the plurality of air passages 423.

The air passage 423 may form an air passage between the lens barrel 400 and the protective sheet 420. Accordingly, in the embodiment, the protective sheet 420 can be easily separated from the lens barrel 400 by the air passage 423. In addition, the air passage 423 may form a non-contact region between the adhesive layer 422 and the lens barrel 400, and accordingly, it is possible to prevent the adhesive component of the adhesive layer 422 from remaining on the upper surface of the lens barrel 400.

That is, the air passage 423 allows the protective sheet 420 to be easily separated from the lens barrel 400, and accordingly, it is possible to minimize the remaining adhesive material of the protective sheet 420 on the lens barrel 400.

The air passage 423 may vary in width from an inside to an outside. For example, a width of one end and a width of the other end of the air passage 423 may be different from each other. Preferably, a width of a portion of the air passage 423 adjacent to an inner side of the protective sheet 420 may be greater than a width of a portion of in the air passage 423 adjacent to an outer side of the protective sheet 420. That is, the width of the air passage 423 may gradually decrease from the inside to the outside of the protective sheet 420. Accordingly, the embodiment can prevent foreign substances from being introduced from the outside of the protective sheet 420 and remaining on the upper surface of the lens barrel 400.

In addition, a lens 410 is disposed in the opening of the lens barrel 400. In this case, foreign substances may flow into the inside through the air passage 423 from the inside of the opening. Accordingly, one end and the other end of the air passage 423 according to another embodiment may have the same width. For example, the width of one end of the air passage 423 and the width of the other end may be the same. However, when one end and the other end of the air passage 423 have the same width, the air passage 423 may vary in width from one end and the other end toward the inner region of the air passage 423. For example, the air passage 423 may increase in width from one end and the other end toward the inner region. Accordingly, the embodiment can prevent foreign substances from entering through the air passage 423 while allowing air to flow out through the air passage 423.

In addition, the inner region (B) and the outer region (A) of the optical film layer 421 may communicate with each other through the air passage 423 of the adhesive layer 422.

Figure 7:
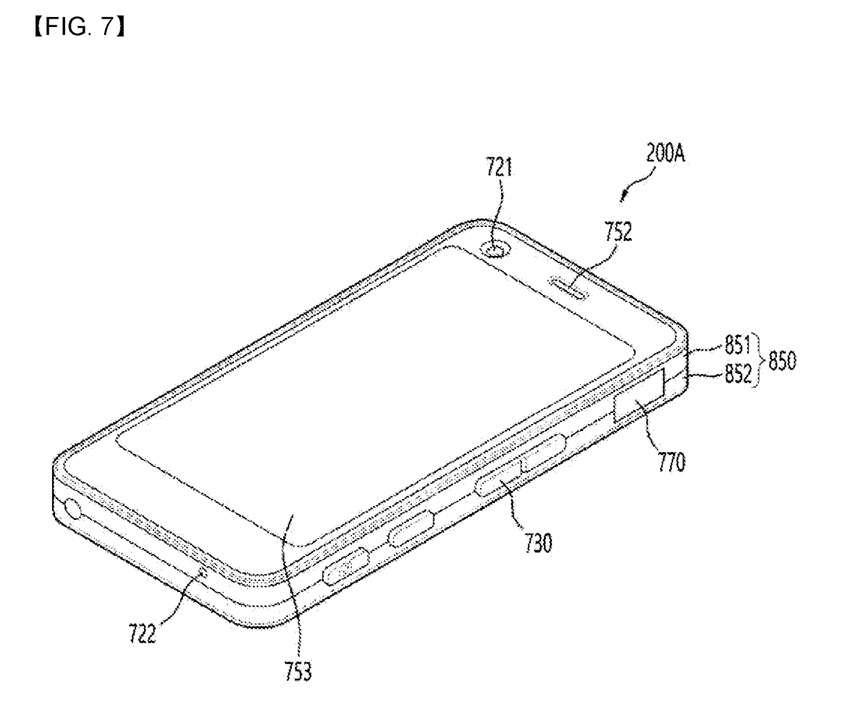
FIG. 7 is a perspective view of a portable terminal according to an embodiment.
Figure 8:
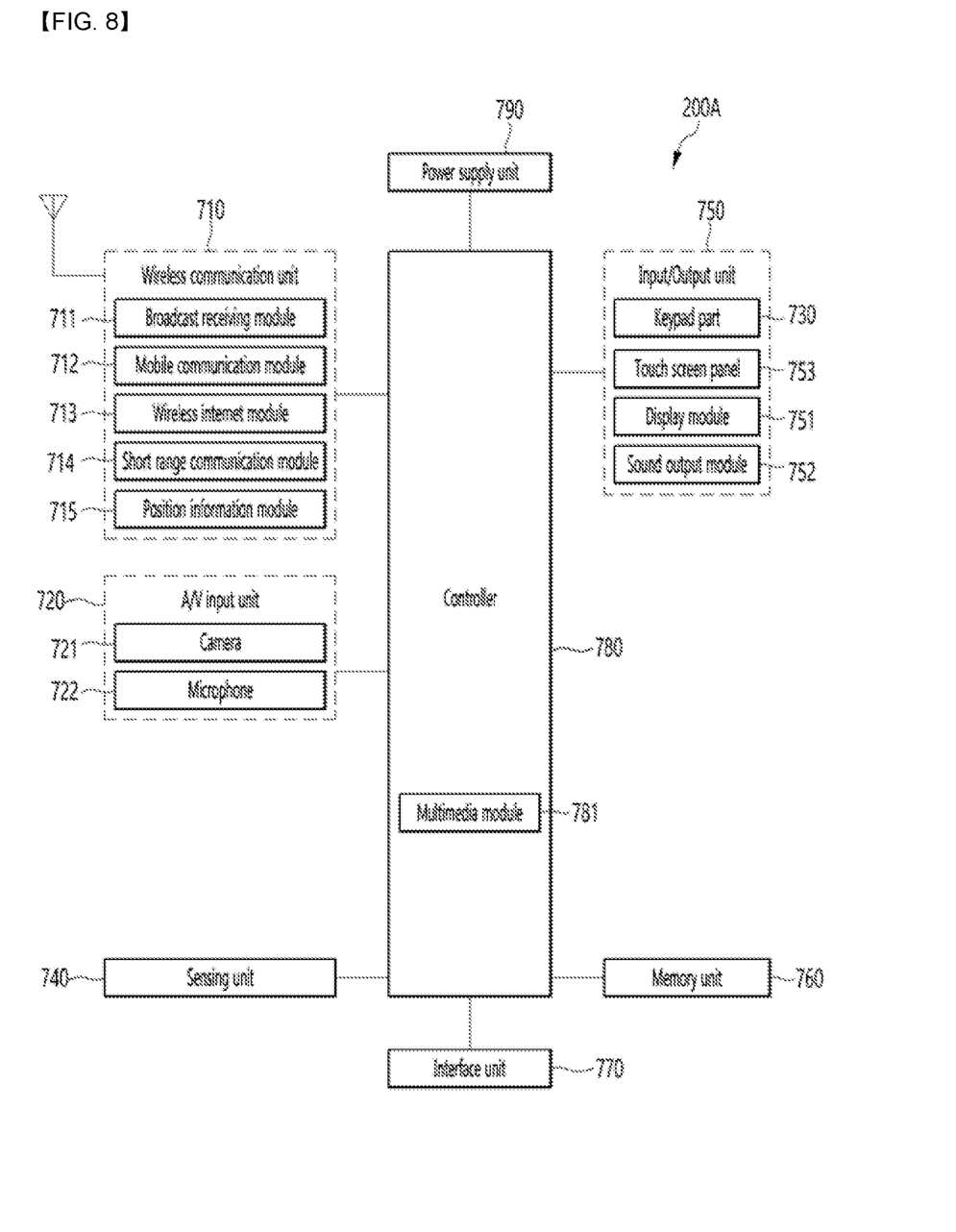
FIG. 8 is a block diagram of the portable terminal shown in FIG. 7.

FIG. 7 is a perspective view of a portable terminal 200A according to an embodiment, and FIG. 8 is a block diagram of the portable terminal shown in FIG. 7.

Referring to FIGS. 7 and 8, the portable terminal (200A, hereinafter referred to as "terminal") may include a body 850, a wireless communication unit 710, an A/V input unit 720, and a sensing unit 740, an input/output unit 750, a memory unit 760, an interface unit 770, a control unit 780, and a power supply unit 790.

The body 850 shown in FIG. 7 is in the form of a bar, but is not limited thereto, and there may be various structures such as a slide type, a folder type, a swing type, a swivel type, in which two or more sub-bodies are coupled to be movable relative to each other.

The body 850 may include a case (casing, housing, cover, etc.) forming an exterior. For example, the body 850 may be divided into a front case 851 and a rear case 852. Various electronic components of the terminal may be embedded in a space formed between the front case 851 and the rear case 852.

The wireless communication unit 710 may include one or more modules that enable wireless communication between the terminal 200A and the wireless communication system or between the terminal 200A and the network in which the terminal 200A is located. For example, the wireless communication unit 710 may include a broadcast reception module 711, a mobile communication module 712, a wireless internet module 713, a short-range communication module 714, and a location information module 715.

The A/V (Audio/Video) input unit 720 is for inputting an audio signal or a video signal, and may include a camera 721 and a microphone 722 and the like.

The camera 721 may include a camera module according to the embodiment shown in FIG. 1.

The sensing unit may detect a current state of the terminal 200A, such as an opening/closing state of the terminal 200A, a position of the terminal 200A, a presence or absence of user contact, an orientation of the terminal 200A, acceleration/deceleration of the terminal 200A, etc. and generate a sensing signal for controlling the operation of the terminal 200A. For example, when the terminal 200A is in the form of a slide phone, it is possible to sense whether the slide phone is opened or closed. In addition, it is responsible for sensing functions related to whether the power supply unit 790 is supplied with power, whether the interface unit 770 is coupled to an external device, and the like.

The input/output unit 750 is for generating input or output related to sight, hearing, or touch. The input/output unit 750 may generate input data for operation control of the terminal 200A, and may also display information processed by the terminal 200A.

The input/output unit 750 may include a keypad unit 730, a display module 751, a sound output module 752, and a touch screen panel 753. The keypad unit 730 may generate input data in response to a keypad input.

The display module 751 may include a plurality of pixels whose color changes according to an electrical signal. For example, the display module 751 may include at least of a liquid crystal display, a thin film transistor-liquid crystal display, an organic light-emitting diode, a flexible display, three-dimensional display (3D display).

The sound output module 752 may output audio data received from the wireless communication unit 710 in a call signal reception, a call mode, a recording mode, a voice recognition mode, or a broadcast reception mode, or the like; or audio data stored in the memory unit 760.

The touch screen panel 753 may convert a change in capacitance generated due to a user's touch on a specific region of the touch screen into an electrical input signal.

The memory unit 760 may store a program for processing and control of the controller 780, and may temporarily store input/output data (eg, phone book, message, audio, still image, photo, video, etc.). For example, the memory unit 760 may store an image captured by the camera 721, for example, a photo or a moving picture.

The interface unit 770 serves as a passage for connecting with an external device connected to the terminal 200A. The interface unit 770 receives data from an external device, receives power and transmits it to each component inside the terminal 200A, or transmits data of the terminal 200A to an external device. For example, the interface unit 770 may include a wired/wireless headset port, an external charger port, a wired/wireless data port, a memory card port, a port for connecting a device having an identification module, and an audio I/O (Input/Output) port, video I/O (Input/Output) port, and an earphone port, and the like.

The controller (controller, 780) may control the overall operation of the terminal 200A. For example, the controller 780 may perform related control and processing for voice calls, data communications, video calls, and the like.

The controller 780 may include a multimedia module 781 for playing multimedia. The multimedia module 781 may be implemented within the controller 180 or may be implemented separately from the controller 780.

The controller 780 may perform a pattern recognition process capable of recognizing a handwriting input or a drawing input performed on the touch screen as characters and images, respectively.

The power supply unit 790 may receive external power or internal power under the control of the control unit 780 to supply power required for the operation of each component.

Although the embodiments of the present invention have been described with reference to the accompanying drawings, those skilled in the art to which the present invention pertains will be understood that the present invention may be implemented in other specific forms without modifying the technical spirit and essential features of the present invention. Therefore, it should be understood that the embodiments described above are illustrative in all aspects and not restrictive.

The invention claimed is:

1. A protective sheet comprising:
an optical film layer including a first open region; and
an adhesive layer disposed on one surface of the optical film layer and including a second open region overlapping the first open region in a vertical direction,
wherein a width of the first open region is smaller than a width of the second open region,
wherein at least a part of the optical film layer overlaps the second open region of the adhesive layer in the vertical direction,
wherein the adhesive layer has at least one air passage connected to the second open region, and
wherein the at least one air passage connects between an outer surface of the adhesive layer and an inner surface of the adhesive layer.

2. The protective sheet of claim 1, wherein an inner surface of the first open region of the optical film layer is positioned further inside than the inner surface of the second open region of the adhesive layer.

3. The protective sheet of claim 1, wherein an outer width of the optical film layer is greater than an outer width of the adhesive layer.

4. The protective sheet of claim 3, wherein at least a part of the one surface of the optical film layer does not overlap with the adhesive layer and the second open region of the adhesive layer in a vertical direction.

5. The protective sheet of claim 1, wherein the first open region entirely overlaps the second open region in a vertical direction.

6. The protective sheet of claim 1, wherein the one surface of the optical film layer includes:
an inner region positioned adjacent to an inner surface of the first open region of the optical film layer and overlapping the second open region of the adhesive layer in a vertical direction; and
an outer region adjacent to an outer surface of the optical film layer and not overlapping with the adhesive layer and the second open region of the adhesive layer in the vertical direction.

7. The protective sheet of claim 6, wherein the inner region and the outer region of the optical film layer communicate with each other through the at least one air passage.

8. The protective sheet of claim 1, wherein the at least one air passage includes a region having a different width from the inner surface of the adhesive layer toward the outer surface of the adhesive layer.

9. The protective sheet of claim 8, wherein the at least one air passage includes one end adjacent to the inner surface of the adhesive layer and the other end adjacent to the outer surface of the adhesive layer, and
wherein the one end and the other end have different widths.

10. The protective sheet of claim 8, wherein the at least one air passage includes one end adjacent to the inner surface of the adhesive layer, the other end adjacent to the outer surface of the adhesive layer, and an inner region between the one end and the other end,
wherein the one end and the other end have the same width, and
wherein a width of the inner region increases toward each of the one end and the other end.

11. The protective sheet of claim 6, wherein the at least one air passage is a plurality of air passages, the plurality of air passages being spaced apart from each other along a circumferential direction of the adhesive layer.

12. A camera module comprising:
a lens barrel including an opening in which a lens is received; and
a protective sheet attached to an upper surface of the lens barrel,
wherein the protective sheet includes:
an optical film layer including a first open region overlapping the opening of the lens barrel in a vertical direction; and
an adhesive layer disposed on one surface of the optical film layer and including a second open region overlapping the first open region in a vertical direction,
wherein a width of the first open region is smaller than a width of the second open region,
wherein at least a part of the optical film layer overlaps the second open region of the adhesive layer in a vertical direction,
wherein the adhesive layer has a plurality of air passages connected to the second open region, and
wherein the plurality of air passages are spaced apart from each other along a circumferential direction of the adhesive layer.

13. The camera module of claim 12, wherein the lens barrel includes a black coating layer, and
wherein the protective sheet is attached on the black coating layer of the lens barrel.

14. The camera module of claim 12, wherein an inner surface of the first open region of the optical film layer is positioned further inside than an inner surface of the second open region of the adhesive layer.

15. The camera module of claim 12, wherein an outer width of the optical film layer is greater than an outer width of the adhesive layer, and
wherein at least a part of the one surface of the optical film layer does not overlap with the adhesive layer and the second open region of the adhesive layer in a vertical direction.

16. The camera module of claim 12, wherein the first open region entirely overlaps the second open region in a vertical direction, and
wherein the one surface of the optical film layer includes:
an inner region positioned adjacent to an inner surface of the first open region of the optical film layer and overlapping the second open region of the adhesive layer in a vertical direction; and
an outer region adjacent to an outer surface of the optical film layer and not overlapping with the adhesive layer and the second open region of the adhesive layer in a vertical direction.

17. The camera module of claim 16, wherein at least one air passage connects between an outer surface of the adhesive layer and an inner surface of the adhesive layer, and
wherein the inner region and the outer region of the optical film layer communicate with each other through the at least one of the plurality of air passages.

18. The camera module of claim 16, wherein at least one of the plurality of air passages includes one end adjacent to the inner surface of the adhesive layer and an other end adjacent to the outer surface of the adhesive layer, and
wherein the one end and the other end have different widths.

19. The camera module of claim 16, wherein at least one of the plurality of air passages includes one end adjacent to the inner surface of the adhesive layer, an other end adjacent to the outer surface of the adhesive layer, and an inner region between the one end and the other end,
wherein the one end and the other end have the same width, and
wherein a width of the inner region increases toward each of the one end and the other end.

* * * * *